(12) United States Patent
Lines et al.

(10) Patent No.: US 6,479,566 B2
(45) Date of Patent: Nov. 12, 2002

(54) ANTIFOULING PAINT

(75) Inventors: Robert Lines, Northumberland Ponteland; Alistair Andrew Finnie, Whitley Bay Tyne & Wear; John Fox, Wallsend Tyne & Wear, all of (GB)

(73) Assignee: International Coatings Limited, London (GB)

( * ) Notice: Subject to any disclaimer, the term of this patent is extended or adjusted under 35 U.S.C. 154(b) by 0 days.

(21) Appl. No.: 09/894,055

(22) Filed: Jun. 28, 2001

(65) Prior Publication Data

US 2002/0035202 A1 Mar. 21, 2002

(30) Foreign Application Priority Data

Jul. 6, 2000 (EP) .............................. 00305726

(51) Int. Cl.⁷ .............................................. C08L 93/04
(52) U.S. Cl. ..................................... 523/122
(58) Field of Search ......................... 523/122

(56) References Cited

U.S. PATENT DOCUMENTS

| | | | |
|---|---|---|---|
| 4,221,839 A | 9/1980 | de Graaf | 428/413 |
| 4,675,051 A | 6/1987 | Baxter | 106/16 |
| 5,302,192 A | 4/1994 | McLearie et al. | 106/18.33 |

FOREIGN PATENT DOCUMENTS

| | | | | |
|---|---|---|---|---|
| EP | 069 559 | 1/1982 | ............ | C09D/5/16 |
| EP | 204 456 | 12/1986 | ............ | C08F/30/04 |
| EP | 529 693 | 3/1993 | ............ | C09D/5/14 |
| EP | 779 304 | 6/1997 | ............ | C08F/8/44 |
| EP | 802 243 | 10/1997 | ............ | C09D/5/16 |
| GB | 1 457 590 | 12/1976 | ............ | C09D/5/16 |
| GB | 2 311 070 | 9/1997 | ............ | C08F/8/42 |
| WO | WO 91/09915 | 7/1991 | ............ | C09D/5/14 |
| WO | WO 91/14743 | 10/1991 | ............ | C09D/5/14 |

OTHER PUBLICATIONS

Abstract of JP 9286933 from EPO on–line data base esp@cenet.
Abstract of JP 01131286 from Japio data base.
Abstract of JP 60028456 from Japio data base.

*Primary Examiner*—Paul R. Michl
(74) *Attorney, Agent, or Firm*—David H. Vickrey

(57) ABSTRACT

The invention relates to an antifouling paint having a binder comprising a rosin material and an auxiliary film-forming resin, the paint including an ingredient having marine biocide properties, wherein the binder comprises a blend of the rosin material and an auxiliary film-forming resin in ratio 20:80 to 95:5% by weight, the auxiliary film-forming resin comprising 20–100% by weight of an acid-functional film forming polymer (A) whose acid groups are blocked by groups capable of hydrolyzing, dissociating or exchanging with seawater species to leave a polymer soluble in seawater, the blocking groups being selected from quaternary ammonium groups which form a quaternary ammonium salt of the polymer and quaternary phosphonium groups which form a quaternary phosphonium salt of the polymer, and 80–20% of a non-hydrolyzing water-insoluble film-forming polymer (B).

22 Claims, No Drawings

ANTIFOULING PAINT

This application claims priority from European Application No. 00305726.2 filed on Jul. 6, 2000.

BACKGROUND OF THE INVENTION

This invention relates to antifouling paint. An antifouling paint is used as a top coat on ships' hulls to inhibit the settlement and growth of marine organisms such as barnacles and algae, generally by release of a biocide for the marine organisms.

Traditionally, antifouling paints have comprised a relatively inert binder with a biocidal pigment which is leached from the paint. Among the binders which have been used are vinyl resins and rosin. The vinyl resins are seawater-insoluble and paints based on them use a high pigment concentration so that there is contact between pigment particles to ensure leaching. Rosin is a hard brittle resin which is very slightly soluble in seawater. Rosin-based antifouling paints have been referred to as soluble matrix or eroding paints. The biocidal pigment is very gradually leached out of the matrix of rosin binder in use, leaving a skeletal matrix of rosin which becomes washed off the hull surface to allow leaching of the biocidal pigment from deep within the paint film.

Many successful antifouling paints in recent years have been "self-polishing copolymer" paints based on a polymeric binder to which biocidal tri-organotin moieties are chemically bound and from which the biocidal moieties are gradually hydrolyzed by seawater, as described for example in GB-A-1457590. Self-polishing copolymer paints which release non-biocidal moieties are described in EP-A-69559, EP-A-204456, EP-A-529693, EP-A-779304, WO-A-91/14743, WO-A-91/09915, GB-A-231070 and JP-A-9-286933.

U.S. Pat. No. 4,675,051 describes a marine antifouling paint which is gradually dissolved in seawater and which comprises a binder which is a resin produced by the reaction of rosin and an aliphatic polyamine containing at least one primary or secondary amine group. EP-A-802243 describes a coating composition comprising a rosin compound, a polymer containing organisilyl ester groups and an antifoulant.

Rosin is not a very good film-former, and it is known to add other film-forming resins to rosin based antifouling paints. This has sometimes led to paints which were difficult to wash off the hull surface. The present invention seeks to improve rosin-based antifouling paints with respect to the strength of the paint film and/or the reliable eroding away of the rosin-based paint matrix after biocide has been leached from the paint.

SUMMARY OF THE INVENTION

An antifouling paint according to one embodiment of the present invention has a binder comprising a rosin material and an auxiliary film-forming resin, the paint including an ingredient having marine biocide properties wherein the binder comprises a blend of the rosin material and an auxiliary film-forming resin in ratio 20:80 to 95:5% by weight, the auxiliary film-forming resin comprising 20–100% by weight of an acid-functional film forming polymer (A) whose acid groups are blocked by groups capable of hydrolyzing, dissociating or exchanging with seawater species to leave a polymer soluble in seawater, the blocking groups being selected from quaternary ammonium groups which form a quaternary ammonium salt of the polymer and quaternary phosphonium groups which form a quaternary phosphonium salt of the polymer, and 80–20% of a non-hydrolyzing water-insoluble film-forming polymer (B).

DETAILED DESCRIPTION OF THE INVENTION

The rosin material is preferably rosin, particularly wood rosin or alternatively tall rosin or gum rosin. The main chemical constituent of rosin is abietic acid. The rosin can be any of the grades sold commercially, preferably that sold as WW (water white) rosin. The rosin material can alternatively be a rosin derivative, for example a maleinised or fumarised rosin, hydrogenated rosin, formylated rosin or polymerised rosin, or a rosin metal salt such as calcium, magnesium, copper or zinc rosinate.

The acid-functional film forming polymer (A) whose acid groups are blocked by groups capable of hydrolyzing, dissociating or exchanging with seawater species to leave a polymer soluble in seawater is preferably an acid-functional polymer whose acid groups are blocked by quaternary ammonium groups which form a quaternary ammonium salt of the polymer. The quaternary ammonium group can be tetra-alkyl or it can contain one or more alkoxyalkyl, cycloalkyl, aryl or aralkyl groups. More generally the organic groups in the quaternary ammonium group may be saturated or unsaturated, aliphatic, cycloaliphatic, aromatic, aliphatic-aromatic or heterocyclic.

The quaternary ammonium moiety preferably contains at least one organic group containing at least 3 carbon atoms, advantageously at least 8 carbon atoms and preferably from 8 to 25 carbon atoms (for example 8 to 20 carbon atoms), and more especially from 12 to 25 carbon atoms. The polymers containing a relatively long chain quaternary ammonium group have a decreased rate of dissolution in seawater. Examples of such quaternary ammonium groups are dodecyl trimethyl ammonium, hexadecyl trimethyl ammonium, octadecyl trimethyl ammonium, oleyl trimethyl ammonium, benzyl dodecyl dimethyl ammonium, dodecyl dimethyl octyl ammonium or trioctyl methyl ammonium. Mixtures of quaternary ammonium groups can be used; for example an organic group having 8 to 20 carbon atoms can be derived from a naturally occurring material such as a natural fatty material. Examples of such mixed quaternary ammonium groups are trimethyl hydrogenated tallow ammonium, dimethyl di(hydrogenated tallow) ammonium or trimethyl coconut ammonium. The quaternary group can alternatively be derived from rosin, for example it can be the N,N,N-trimethyl derivative of the amine sold commercially as "Rosin Amine D", being mainly dehydroabietyl trimethyl ammonium. Advantageously, the total number of carbon atoms in the quaternary ammonium moiety is 8 or more, preferably 12 or more (for example, from 12 to 40).

The acid-functional film forming polymer (A) whose acid groups are blocked by groups capable of hydrolyzing, dissociating or exchanging with seawater species to leave a polymer soluble in seawater is alternatively an acid-functional polymer whose acid groups are blocked by quaternary phosphonium groups which form a quaternary phosphonium salt of the polymer. The quaternary phosphonium group can be tetra-alkyl or it can contain one or more alkoxyalkyl, cycloalkyl, aryl or aralkyl groups. More generally the organic groups in the quaternary phosphonium group may be saturated or unsaturated, aliphatic, cycloaliphatic, aromatic, aliphatic-aromatic or heterocyclic. Examples of such quaternary phosphonium groups are tetrabutylphosphonium, tetraphenylphosphonium and stearyltributylphosphonium.

The acid-functional polymer is preferably an addition copolymer of an olefinically unsaturated carboxylic acid, sulphonic acid, acid sulphate ester, phosphonic acid or acid phosphate ester and at least one unsaturated co-monomer. The unsaturated carboxylic acid can for example be acrylic or methacrylic acid or an acid functional ester or amide of acrylic acid or methacrylic acid such as mono-2-(methacryloyloxy)ethyl succinate, mono-2-(methacryloyloxy)ethyl phthalate, 2-acrylamidoglycolic acid, or 3-acrylamido-3-methylbutyric acid. The unsaturated sulphonic acid can for example be 2-acrylamido-2-methylsulphonic acid (AMPS). The unsaturated comonomer can for example be an ester or amide of an alkyl, alkoxyalkyl, carbocylic or heterocyclic alcohol or amine with an unsaturated carboxylic acid, such as methyl acrylate or methacrylate, butyl acrylate or methacrylate and isobornyl acrylate or methacrylate and the like. Alternatively the unsaturated co-monomer may be a vinylic compound, for example styrene, vinyl pyrollidone or vinyl acetate.

The acid-functional film forming polymer (A) whose acid groups are blocked by quaternary ammonium groups which form a quaternary ammonium salt of the polymer can be prepared by reaction of a polymer containing acid or acid-salt groups with a quaternary ammonium compound. Alternatively, it can be prepared by polymerisation of a quaternary ammonium salt of an ethylenically unsaturated acid-functional monomer formed, for example, by reaction of an ethylenically unsaturated monomer containing acid or acid-salt groups with a quaternary ammonium compound. Examples of suitable acid-salts groups include metal salts such as sodium, potassium and lithium salts, or amine salts such as ammonium or hydroxyethyldimethylammonium salts and the like. Examples of suitable quaternary ammonium compounds include quaternary ammonium hydroxides, carbonates, bicarbonates, sulphates, bisulphates or halides.

The acid-functional film forming polymer (A) whose acid groups are blocked by quaternary phosphonium groups which form a quaternary phosphonium salt of the polymer can be prepared by similar methods to those used to prepare the acid-functional film forming polymer (A) whose acid groups are blocked by quaternary ammonium groups, using a quaternary phosphonium compound in place of the quaternary ammonium compound.

As a further possibility, when the acid-functional film forming polymer (A) whose acid groups are blocked by quaternary ammonium or quaternary phosphonium groups is a copolymer of an olefinically unsaturated sulphonic acid, the quaternary ammonium or quaternary phosphonium group may be introduced by reaction of a sulphonate ester, for example a methylsulphonate ester, with a tertiary amine or tertiary phosphine. The sulphonate ester may be in monomeric or polymeric form. If the ester is in monomeric form, the resulting quaternary ammonium or quaternary phosphonium salt of an olefinically unsaturated sulphonic acid-functional monomer is then polymerised for use according to the present invention.

The non-hydrolyzing water-insoluble film-forming polymer (B) can for example be a vinyl ether polymer, for example a poly(vinyl alkyl ether) or a copolymer of a vinyl alkyl ether with vinyl acetate or vinyl chloride, an acrylate ester polymer such as a homopolymer or copolymer of one or more alkyl acrylates or methacrylates which preferably contain 1 to 6 carbon atoms in the alkyl group and may contain a co-monomer such as acrylonitrile or styrene, or a vinyl acetate polymer such as polyvinyl acetate or a vinyl acetate vinyl chloride copolymer. The polymer (B) can alternatively be a polyamine, particularly a polyamide having a plasticising effect such as a polyamide of a fatty acid dimer or the polyamide sold under the Trademark "Santiciser".

We have found that the paints of the invention have the optimum combination of film-forming and eroding properties when the non-hydrolyzing water-insoluble film-forming polymer (B) is present in the composition, albeit as a minor proportion of the auxiliary film-forming resin. Most preferably the weight ratio of rosin to total auxiliary film-forming resin is from 25:75, 50:50 or 55:45 up to 80:20. The hydrolyzing or dissociating film-forming polymer (A) preferably forms at least 30, most preferably at least 50, up to 80 or 90% by weight of the auxiliary film-forming resin, the non-hydrolyzing water-insoluble polymer (B) being the remainder.

The antifouling paint can include a non-polymeric plasticiser. Such a plasticiser can for example be present at up to 50% by weight based on the total binder polymer, most preferably at least 10% and up to 35% by weight based on binder polymer. Examples of such plasticisers are phthalate esters such as dibutyl phthalate, butyl benzyl phthalate or dioctyl phthalate, phosphate triesters such as tricresyl or tris(isopropyl)phenyl phosphate, or chlorinated paraffins.

The rosin and the polymers forming the auxiliary film-forming resin can be mixed in a common solvent which forms at least part of the paint solvent, for example an aromatic hydrocarbon such as xylene, toluene or trimethylbenzene, an alcohol such as n-butanol, an ether alcohol such as butoxyethanol or methoxypropanol, an ester such as butyl acetate or isoamyl acetate, an ether-ester such as ethoxyethyl acetate or methoxypropyl acetate, a ketone such as methyl isobutyl ketone or methyl isoamyl ketone, an aliphatic hydrocarbon such as white spirit, or a mixture of two or more of these solvents. The paint can alternatively be water-based, for example it can be based on a commercial aqueous rosin dispersion.

The ingredient having marine biocidal properties usually is a biocide for aquatic organisms or a pigment. This biocide or pigment can be mixed with the binder using conventional paint-blending techniques. The biocide may itself be all or part of the pigment of the paint. The coating composition preferably has a pigment volume concentration of, for example, 15 to 55%. The pigment preferably comprises at least one sparingly soluble metalliferous pigment having a solubility in seawater of from 0.5 to 10 parts per million by weight. Examples of such pigments which are also aquatic biocides include copper or zinc compounds, such as cuprous oxide, cuprous thiocyanate, cuprous sulphate, zinc ethylene bis(dithiocarbamate), zinc dimethyl dithiocarbamate, zinc pyrithione, copper pyrithione, zinc diethyl dithiocarbamate, copper resinate or cuprous ethylene bis(dithiocarbamate). Other sparingly soluble pigments having a solubility in sea water of 0.5 to 10 parts per million include barium sulphate, calcium sulphate, dolomite and zinc oxide. Mixtures of sparingly soluble pigments can be used, for example cuprous oxide, cuprous thiocyanate or zinc ethylene bis (dithiocarbamate), which are highly effective biocidal pigments, can be mixed with zinc oxide, which is not effective as a biocide but dissolves slightly more rapidly in seawater. Copper metal can be present as an aquatic biocide, for example in flake or powder form.

The antifouling coating composition can contain a non-metalliferous biocide for marine organisms, for example tetramethyl thiuram disulphide, methylene bis(thiocyanate), captan, pyridiniumtriphenylboron, a substituted isothiazolone such as 4,5-dichloro-2-n-octyl-4-isothiazolin-3-one, 2-methylthio-4-t.butylamino-6-cyclopropylamino-s-triazine, N-3,4dichlorophenyl-N',N'-dimethyl-urea ("Diuron"), 2-(thio-cyanomethylthio)benzothiazole, 2,4,5,6-tetrachloro-isophthalonitrile, dichlofluanid, tolylfluanid or 2,3,5,6-tetrachloro-4-(methyl-sulphonyl)pyridine. Such a non-metalliferous biocide can be used as the only biocide of the coating in a copper-free, or even metal-free or pigment-free, antifouling coating. Many of these non-metalliferous biocides are solid and all are sparingly soluble in seawater and may help the "self-polishing" action of the paint.

The coating composition can additionally contain a pigment which is not reactive with seawater and may be highly insoluble in seawater (solubility below 0.5 part per million by weight) such as titanium dioxide or ferric oxide or an organic pigment such as phthalocyanine or azo pigment. Such highly insoluble pigments are preferably used at less than 60% by weight of the total pigment component of the paint, most preferably less than 40%. The coating composition can additionally contain conventional thickeners, particularly thixotropes such as silica or bentonite and/or stabilisers, for example zeolites or aliphatic or aromatic amines such as dehydroabietylamine.

The invention will be elucidated with reference to the following examples. These are intended to illustrate the invention but are not to be construed as limiting in any manner the scope thereof.

EXAMPLES

The following materials were mixed in the stated % by weight in a high speed disperser to form antifouling paints according to the invention.

|  | Example No.: | |
| --- | --- | --- |
| Compound | 1 | 2 |
| Rosin | 9.96 | 9.96 |
| Hydrolysable acrylic Polymer (A1) | 5.49 | — |
| Hydrolysable acrylic Polymer (A2) | — | 5.49 |
| Non-hydrolyzing acrylic polymer (B1) | 2.62 | 2.62 |
| Tris(isopropylphenyl) phosphate plasticiser | 5.09 | 5.09 |
| Red copper oxide | 37.48 | 37.48 |
| Zinc Oxide | 11.85 | 11.85 |
| Zinc ethylene bis(dithiocarbamate) | 2.05 | 2.05 |
| Copper pyrithione | 1.98 | 1.98 |
| Natural iron oxide | 3.16 | 3.16 |
| Solvent | 17.64 | 17.64 |
| Additives | 2.68 | 2.68 |

Acrylic polymer A1 is a copolymer of the trimethyl (hydrogenated tallow)ammonium salt of mono-2-(methacryloyloxy) ethylsuccinate, styrene and isobornyl methacrylate in the mole ratio 25.0:30.0:45.0.

Acrylic polymer A2 is a copolymer of the hexadecyltrimethylammonium salt of 2-acrylamido-2-methylpropanesulphonic acid, isobornyl methacrylate and isobornyl acrylate in mole ratio 27.5:47.5:25.

Acrylic polymer B1 is a n-butyl acrylate polymer sold under the Trademark "Acronal 4F".

The solvent comprised mainly xylene with minor amounts of methyl isoamyl ketone, methyl isobutyl ketone and n-butanol. The rosin and acrylic polymers were dissolved in solvent before being mixed with the other paint ingredients.

Additives comprised an organo-clay structuring agent, silica, carbon black and molecular sieve zeolite.

As a test of antifouling performance the paints of Examples 1 and 2 were each applied to plywood boards which had been pre-painted with a commercial anti-corrosive primer and the boards were immersed in the sea at Newton Ferrers, Devon, England. As a comparative test, primed boards were coated with a rosin paint having a formulation similar to Example 1 but containing extra "Acronal 4F" in place of the hydrolysable acrylic polymer. The paint films were periodically assessed for settlement of marine fouling organisms and the results are shown below.

In all results quoted below, 100=Totally clean, 0=Totally fouled.

| Example | Average fouling rating |
| --- | --- |
| 1 | 83 |
| 2 | 88 |
| Comparative | 60 |

What is claimed is:

1. An antifouling paint having a binder comprising a rosin material and an auxiliary film-forming resin, the paint including an ingredient having marine biocide properties wherein the binder comprises a blend of the rosin material and an auxiliary film-forming resin in ratio 20:80 to 95:5% by weight, the auxiliary film-forming resin comprising 20–100% by weight of an acid-functional film forming polymer (A) whose acid groups are blocked by groups capable of hydrolyzing, dissociating or exchanging with seawater species to leave a polymer soluble in seawater, the blocking groups being selected from quaternary ammonium groups which form a quaternary ammonium salt of the polymer and quaternary phosphonium groups which form a quaternary phosphonium salt of the polymer, and 80–20% of a non-hydrolyzing water-insoluble film-forming polymer (B).

2. An antifouling paint according to claim 1 wherein the rosin material is rosin.

3. An antifouling paint according to claim 1 wherein the binder comprises a blend of the rosin material and the auxiliary film-forming resin in a ratio of 55:45 to 80:20 by weight.

4. An antifouling paint according to claim 2 wherein the binder comprises a blend of the rosin material and the auxiliary film-forming resin in a ratio of 55:45 to 80:20 by weight.

5. An antifouling paint according to claim 1 wherein the auxiliary film-forming resin comprises 30–90% by weight of the film-forming polymer (A) capable of hydrolyzing or dissociating to a polymer soluble in sea water and 70–10% by weight of the non-hydrolyzing water-insoluble film-forming polymer (B).

6. An antifouling paint according to claim 2 wherein the auxiliary film-forming resin comprises 30–90% by weight of the film-forming polymer (A) capable of hydrolyzing or dissociating to a polymer soluble in sea water and 70–10% by weight of the non-hydrolyzing water-insoluble film-forming polymer (B).

7. An antifouling paint according to claim 3 wherein the auxiliary film-forming resin comprises 30–90% by weight of the film-forming polymer (A) capable of hydrolyzing or dissociating to a polymer soluble in sea water and 70–10% by weight of the non-hydrolyzing water-insoluble film-forming polymer (B).

8. An antifouling paint according to claim 4 wherein the auxiliary film-forming resin comprises 30–90% by weight of the film-forming polymer (A) capable of hydrolyzing or dissociating to a polymer soluble in sea water and 70–10% by weight of the non-hydrolyzing water-insoluble film-forming polymer (B).

9. An antifouling paint according to claim 1 wherein the film-forming polymer (A) is a quaternary ammonium salt of an addition copolymer of an olefinically unsaturated sulphonic acid or acid sulphate ester and at least one olefinically unsaturated co-monomer.

10. An antifouling paint according to claim 2 wherein the film-forming polymer (A) is a quaternary ammonium salt of an addition copolymer of an olefinically unsaturated sulphonic acid or acid sulphate ester and at least one olefinically unsaturated co-monomer.

11. An antifouling paint according to claim 3 wherein the film-forming polymer (A) is a quaternary ammonium salt of an addition copolymer of an olefinically unsaturated sulphonic acid or acid sulphate ester and at least one olefinically unsaturated co-monomer.

12. An antifouling paint according to claim 4 wherein the film-forming polymer (A) is a quaternary ammonium salt of an addition copolymer of an olefinically unsaturated sulphonic acid or acid sulphate ester and at least one olefinically unsaturated co-monomer.

13. An antifouling paint according to claim 5 wherein the film-forming polymer (A) is a quaternary ammonium salt of an addition copolymer of an olefinically unsaturated sulphonic acid or acid sulphate ester and at least one olefinically unsaturated co-monomer.

14. An antifouling paint according to claim 6 wherein the film-forming polymer (A) is a quaternary ammonium salt of an addition copolymer of an olefinically unsaturated sulphonic acid or acid sulphate ester and at least one olefinically unsaturated co-monomer.

15. An antifouling paint according to claim 7 wherein the film-forming polymer (A) is a quaternary ammonium salt of an addition copolymer of an olefinically unsaturated sulphonic acid or acid sulphate ester and at least one olefinically unsaturated co-monomer.

16. An antifouling paint according to claim 8 wherein the film-forming polymer (A) is a quaternary ammonium salt of an addition copolymer of an olefinically unsaturated sulphonic acid or acid sulphate ester and at least one olefinically unsaturated co-monomer.

17. An antifouling paint according to claim 1 wherein the film-forming polymer (A) is a quaternary ammonium salt of an addition copolymer of an olefinically unsaturated carboxylic acid and at least one olefinically unsaturated co-monomer.

18. An antifouling paint according to claim 9 wherein the quaternary ammonium group contains at least one aliphatic hydrocarbon group having 8 to 25 carbon atoms.

19. An antifouling paint according to claim 10 wherein the quaternary ammonium group contains at least one aliphatic hydrocarbon group having 8 to 25 carbon atoms.

20. An antifouling paint according to claim 17 wherein the quaternary ammonium group contains at least one aliphatic hydrocarbon group having 8 to 25 carbon atoms.

21. An antifouling paint according to claim 1 wherein the non-hydrolyzing water-insoluble film-forming polymer (B) is an acrylate ester polymer or a vinyl ether polymer.

22. An antifouling paint according to claim 1 wherein the binder includes a non-polymeric plasticiser present at up to 50% by weight based on the total binder polymer.

\* \* \* \* \*

UNITED STATES PATENT AND TRADEMARK OFFICE
CERTIFICATE OF CORRECTION

PATENT NO.   : 6,479,566 B2
DATED        : November 12, 2002
INVENTOR(S)  : Lines et al.

It is certified that error appears in the above-identified patent and that said Letters Patent is hereby corrected as shown below:

<u>Title page,</u>
Item [57], ABSTRACT, "95:5%" should read -- 95:5 --

<u>Column 1,</u>
Line 60, "95:5%" should read -- 95:5 --

<u>Column 6,</u>
Line 28, "95:5%" should read -- 95:5 --

Signed and Sealed this

First Day of April, 2003

JAMES E. ROGAN
*Director of the United States Patent and Trademark Office*